United States Patent
Martinez-Uriegas et al.

(10) Patent No.: US 6,965,698 B2
(45) Date of Patent: Nov. 15, 2005

(54) IMAGE COMPOSITION FOR USE IN LOSSY COMPRESSION

(75) Inventors: Eugenio Martinez-Uriegas, Mountain View, CA (US); Thomas Schumacher, Cupertino, CA (US)

(73) Assignee: Canon Kabushiki Kaisha, Tokyo (JP)

(*) Notice: Subject to any disclaimer, the term of this patent is extended or adjusted under 35 U.S.C. 154(b) by 664 days.

(21) Appl. No.: 10/023,755

(22) Filed: Dec. 21, 2001

(65) Prior Publication Data

US 2003/0118238 A1 Jun. 26, 2003

(51) Int. Cl.[7] .............................................. G06K 9/36
(52) U.S. Cl. .................................................... 382/232
(58) Field of Search ............................... 382/232–233, 382/236, 238–240, 244, 248, 250, 251, 284; 375/240.01, 240.02, 240.03, 240.05; 348/14.01, 14.12, 14.13, 403.1, 404.1, 405.1; 358/426.03, 426.06, 426.07, 426.11, 426.13, 426.14

(56) References Cited

U.S. PATENT DOCUMENTS

| | | | |
|---|---|---|---|
| 5,535,311 A | 7/1996 | Zimmerman | 395/114 |
| 5,600,373 A | 2/1997 | Chui et al. | 348/397 |
| 5,625,712 A | 4/1997 | Schoenzeit et al. | 382/232 |
| 5,682,441 A | 10/1997 | Ligtenberg et al. | 382/232 |
| 5,974,182 A | 10/1999 | Bryniarski et al. | 382/232 |
| 6,128,031 A | 10/2000 | Schmidt et al. | 348/5.5 |
| 6,137,914 A | 10/2000 | Ligtenberg et al. | 382/240 |
| 6,167,158 A * | 12/2000 | Boon | 382/238 |
| 6,181,823 B1 | 1/2001 | Takahashi | 382/232 |
| 6,236,757 B1 * | 5/2001 | Zeng et al. | 382/240 |
| 6,275,620 B2 * | 8/2001 | de Queiroz et al. | 382/270 |
| 6,330,369 B1 * | 12/2001 | Cornog et al. | 382/251 |
| 6,510,249 B1 * | 1/2003 | Boon | 382/238 |
| 6,563,960 B1 * | 5/2003 | Chan et al. | 382/284 |
| 6,606,413 B1 * | 8/2003 | Zeineh | 382/232 |
| 6,608,928 B1 * | 8/2003 | Queiroz | 382/173 |

\* cited by examiner

*Primary Examiner*—Jose L. Couso
(74) *Attorney, Agent, or Firm*—Fitzpatrick, Cella, Harper & Scinto (57) ABSTRACT

The present invention, which can be used with any lossy compression, concerns the selection of images to form a composite image which comprises the selected images, wherein, for at least one of the selected images, lossy compression of the composite image results in an improved compressibilty.

15 Claims, 5 Drawing Sheets

| 402 | 403 | 404 | 405 |
|---|---|---|---|
| IMAGE ID | COMPRESSION RATE | RMSE | SIZE |

| 412 | 413 | 414 |
|---|---|---|
| COMPOSITE ID | IMAGE ID | RMSE |

| 422 | 423 | 424 |
|---|---|---|
| COMPOSITE ID | IMAGE ID | RELATIVE IMPROVEMENT |

IMAGE COMPOSITION FOR USE IN LOSSY COMPRESSION

BACKGROUND OF THE INVENTION

1. Field of the Invention

The present invention relates to image compression using lossy compression, and more particularly, to the formation of a composite image from images selected such that the compression of the selected images as part of the composite image results in an improvement in quality for at least one of the selected images.

2. Description of the Related Art

Image data may be represented digitally for storage and manipulation using a computer system. In addition, digital image data may be transferred between computer systems via a network. In order to reduce the amount of computing resources needed (e.g., for storage and transmission), various compression schemes have been used to reduce the size of an image file.

In general, a compression scheme encodes the data with the desired result being a reduction in the size of the data. A complimentary decompression scheme is then used to decompress the compressed data. There are two general types of compression: lossy and lossless. Using lossless compression, data can be compressed and then decompressed without any loss in data. However, with lossy compression, some data may be lost as a result of compressing and decompressing the data.

It is a requirement with certain data, such as financial data, that there be unity between the original and decompressed versions. However, where some degree of data loss is acceptable with image data, lossy compression can be used to compress digital image data.

In lossy compression, there is a tradeoff between retention of image quality (after image decompression) and compressed file size. That is, as the rate of compression increases, the likelihood of data loss increases thereby reducing the quality of the resulting image upon decompression. For example, the likelihood for data loss tends to be greater when an image is compressed to a tenth of its original size than when it is reduced to a fifth of its size.

The content and characteristics of the image can affect the compressibility of the image. For example, an image's compressibility can depend on the number of transitions within the image (i.e., the busyness of the image). That is, the fewer the number of transitions, the better the compressibility.

When compressing an image, it would therefore be beneficial to be able to "take advantage of" a compressibility of one image to improve on the compressibility of another image.

SUMMARY OF THE INVENTION

The present invention concerns a composite image, which is formed from selected individual images such that, for at least one of the selected images, compression of the composite image results in improved compressibility. While the present invention is described with reference to images and files containing image data, it should be understood that the present invention can be used with other types of data as well.

With lossy compression, there is a tradeoff between the amount of compression used and the amount of data loss. That is, as the rate of compression increases, there is typically a decreased level of quality in the resulting decompressed image.

By combining separate, or individual, images into a composite image according to the present invention, it is possible to improve one image's compressibility by compressing the image along with one or more other images. For example, by compressing images together, it is possible to take advantage of one image's compressibility in order to increase the rate of compression associated with one or more of the images in the composite while maintaining a certain level of quality. Conversely, it is possible to improve the level of quality associated with an image without changing the rate of compression by compressing images together.

Generally, in selecting images for the composite image, the compressibility for each image, which is determined by compressing each image individually, is examined to select images that compliment each other. The selected images are compressed as a composite image is compressed and each image within the composite image is either first extracted and then decompressed, or the composite image is decompressed first and the image is then extracted. With some compression methods, unlike the newest standard JPEG2000, it is necessary to decompress the composite image first, and then separate individual images, unless tags or indices are included within the compressed file.

A comparison is done to determine whether the compressibility of an image improves as a result of its inclusion in the composite image. Optimally, a composite image is selected that maximizes the number of images whose individual compressibility improves by virtue of their inclusion in the composite image, and that maximizes the overall compressibility of the images in the composite image. Other considerations, such as image size as well as related uses of the images, may also be taken into account.

According to the present invention, images are selected from a plurality of individual images, from which a composite image is created, wherein, for at least one of the selected images, lossy compression of the composite image results in improved compressibility.

This brief summary has been provided so that the nature of the invention may be understood quickly. A more complete understanding of the invention can be obtained by reference to the following detailed description of the preferred embodiment(s) thereof in connection with the attached drawings.

DETAILED DESCRIPTION OF THE PREFERRED EMBODIMENTS

Figure 1:
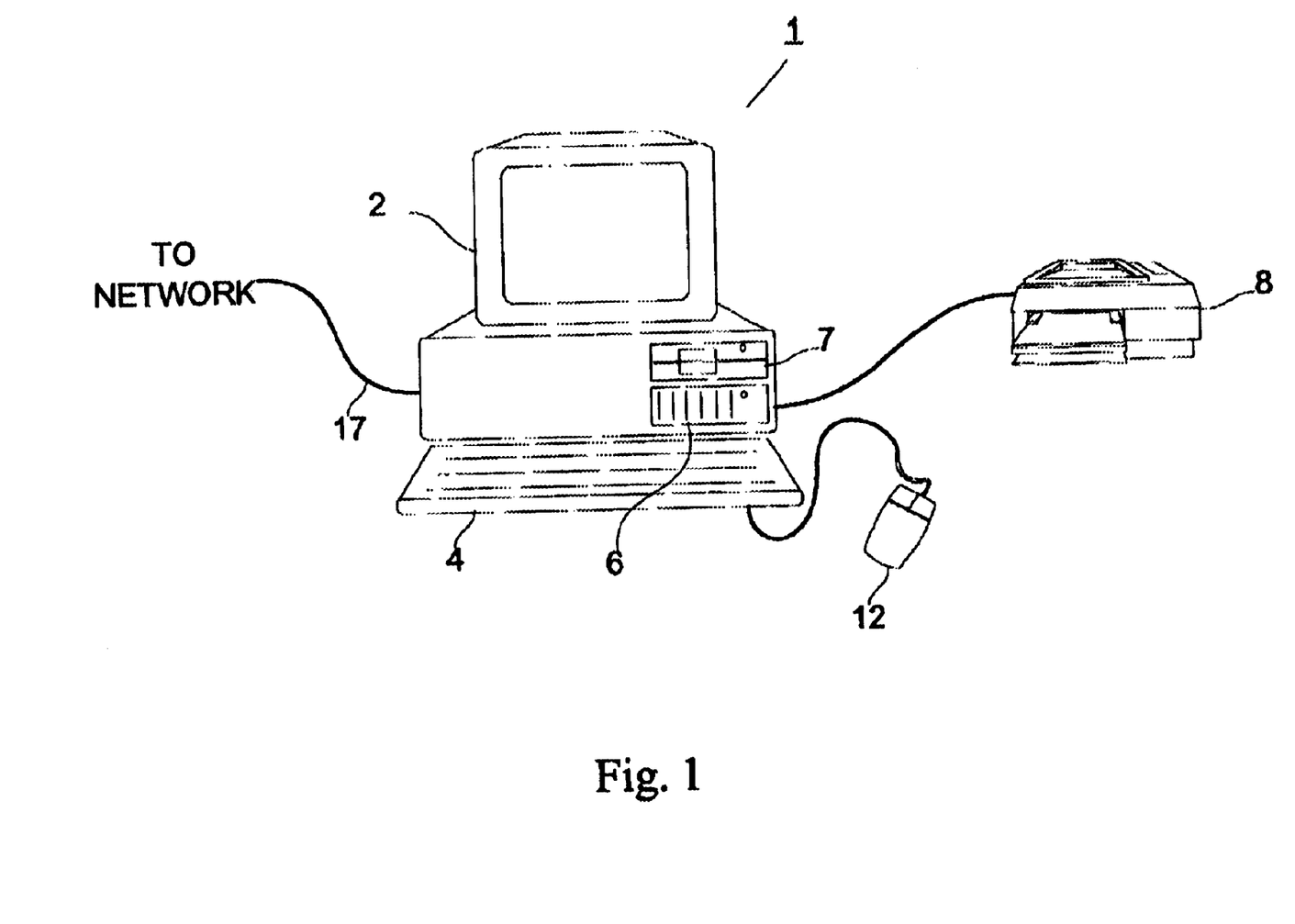
FIG. 1 is an outward view of a hardware environment embodying the present invention.

FIG. 1 is an outward view of representative computing hardware embodying the present invention. It should be apparent that the present invention is not limited to use with the computing hardware shown in FIG. 1, and that other computing hardware configurations may be used with the present invention.

Shown in FIG. 1 are computer 1 executing an operating system, such as Microsoft Windows98®, display monitor 2 for displaying text and images to a user, keyboard 4 for entering text and commands into computer 1, and mouse 5 for manipulating and for selecting objects displayed on display monitor 2. Also included with computer 1 are fixed disk drive 6, in which are stored application programs, such as digital image processing, word processing, graphics, and other applications as well as data files, and device drivers for controlling peripheral devices attached to computer 1, floppy disk drive 7 for use in reading data from and writing data to floppy disks inserted therein. Data and/or applications may also be accessed from a CD-ROM via a CD-ROM drive (not shown) or over a network to which computer 1 may be connected via network connection 17. Network connection 17 may connect computer 1 to any network (e.g., local or wide area network, internet, etc.) using a suitable network connection, which may include a modem (e.g., serial, cable, dsl, etc.). Floppy disk drive 7 may be used to read data from and write data to floppy disks inserted therein.

Figure 2:
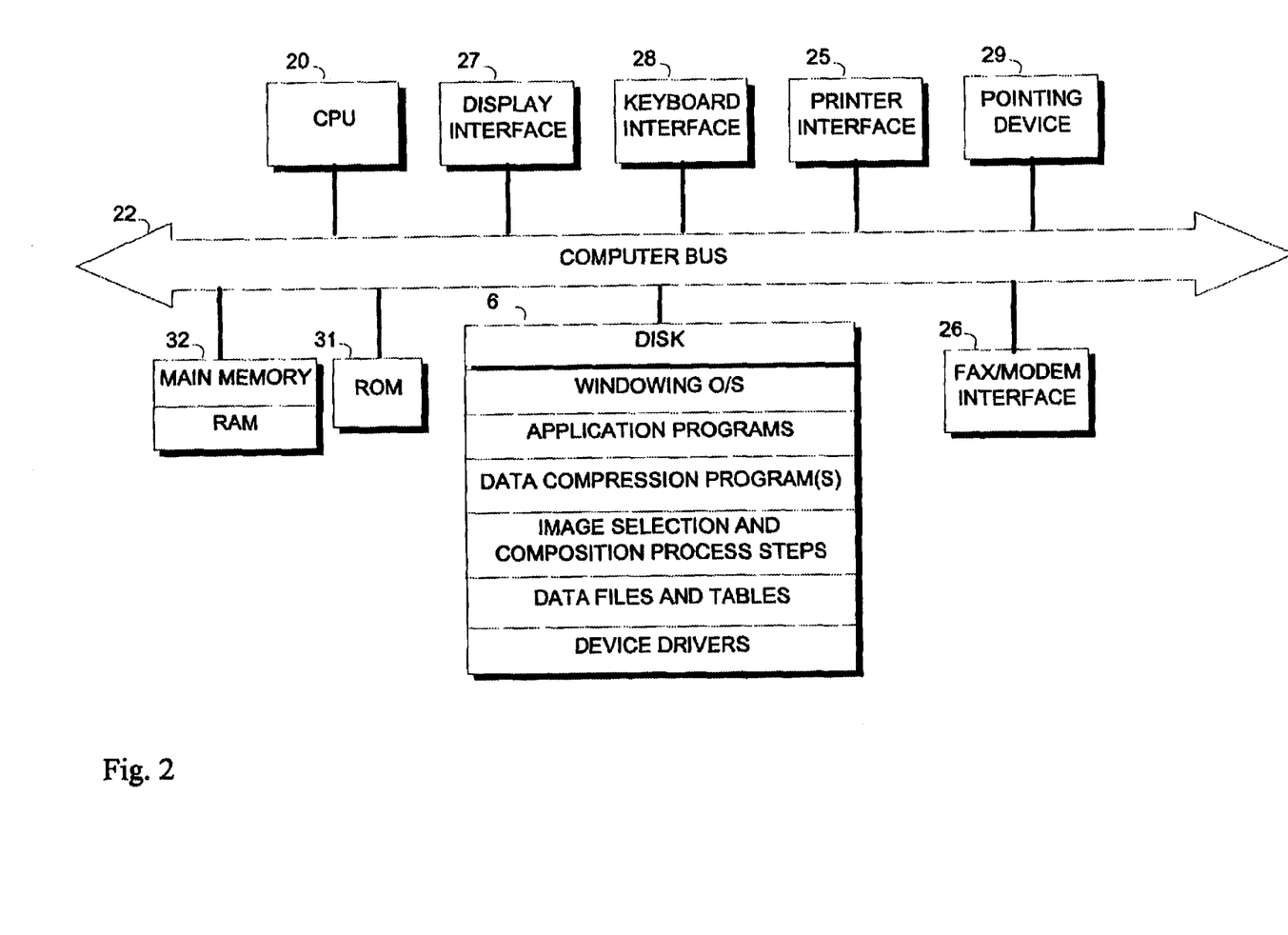
FIG. 2 is a block diagram of the internal architecture of a personal computer for use in conjunction with the present invention.

FIG. 2 is a block diagram of the internal architecture of computer 1. Shown in FIG. 2 are CPU 20, which is preferably a Pentium-type microprocessor, interfaced to computer bus 22. Also interfaced to computer bus 22 are printer interface 25, to allow computer 1 to communicate with printer 8 (in FIG. 1), modem interface 26 to enable communications between computer 1 and its internal modem, display interface 27 for interfacing with display monitor 2, keyboard interface 28 for interfacing with keyboard 4, and mouse interface 29 for interfacing with mouse 5.

Read only memory (ROM) 31 stores invariant computer-executable process steps for basic system functions such as basic I/O, start up, or reception of keystrokes from keyboard 4.

Main random access memory (RAM) 32 provides CPU 20 with memory storage which can be accessed quickly. In this regard, computer-executable process steps are transferred from disk 6 over computer bus 22 to RAM 32 and executed therefrom by CPU 20.

Also shown in FIG. 2 is disk 6 which, as described above, includes an operating system (e.g., a windowing operating system). In addition to those applications mentioned above, other applications may include, but are not limited to a web browser, spreadsheet, image processing, etc. Disk 6 further includes data files and device drivers as shown.

Disk 6 includes program code, which implements one or more lossy compression techniques. One example of such lossy compression techniques is that described by the conventional JPEG (Joint Photographic Experts Group) standard, which is based on discrete cosine transform (DCT) as well as the new compression standard, JPEG2000, which is based on wavelets.

Computer 1 is used to execute program code or process steps to compress image data using lossy compression, where the image data comprises a composite of individual images, which are selected such that, for at least one of the selected images, lossy compression of the composite image results in improved compressibility. As such, disk 6 further includes process steps to select images for a composite image, and data files and tables for use therein.

Generally, compressibility is an expression, in one form or another, of the relationship between the amount of compression and any data loss associated therewith. Compressibility is traditionally used to refer to an extent to which an image can be compressed without resulting in an undesirable level of degradation in the quality of the image.

Compressibility can be expressed using any of the methods known in the art, including methods which compute image statistics based on the correlation between the image and the basis functions used for decomposition and quantization (e.g., DCT basis functions, wavelet set, fractal set sub-band filter set, etc.)

As it is used herein, compressibility refers to a compression outcome, which is preferably expressed relative to another compression outcome. According to the present invention, compression of an image by itself is compared with compression of the image as part of a composite image in order to determine whether it is advantageous to compress the image as part of the composite.

A measurement that is preferably used to determine compression outcome, or improved compressibility, is a measure of error after decompression. An example of such a measurement is referred to herein as a root mean square error (or RMSE).

RMSE is a measurement of error introduced by compressing and then decompressing an image. The decompressed image is compared with the original image to determine an RMSE. In the present invention, a relative improvement value, which is based on an individual RMSE and a composite RMSE, is used as a measure of compressibility. An individual RMSE is a measure of change between pixels in an original image and pixels in a decompressed version of the original image, where the original image is compressed as an individual component. A composite RMSE is a measure of change between pixels in an original image and pixels in a decompressed version of the original image, where the original image is compressed as a component of a composite image.

By combining separate, or individual, images into a composite image according to the present invention, it is possible to improve one image's compressibility by compressing the image along with one or more other images "compliment" the first image. For example, by compressing images together, it is possible to take advantage of one image's characteristics in order to improve the compressibility of one or more of the images in a composite.

An overview of a process of improving lossy compression of selected images by compressing the selected images as a composite image according to the present invention is described with reference to the process steps of FIG. 3.

Generally, for each of various RMSEs, original images are compressed individually, in order to identify a rate of compression that achieves each of the various RMSEs. Plural images are then selected to form one or more composite images, each of which is compressed at a minimum compression rate. A compressed composite image is decompressed, and an RMSE is determined for each component image of a composite image. An optimal composite image is selected based on the relative improvement ratios of its component images.

More particularly, original images 321 become input to step S301, in which images 321 are compressed individually, and the compression rates needed to achieve a target RMSE are identified for each of images 321. That is, given a target RMSE, a compression rate is determined for each of images 321, at which the target RMSE is achieved.

It is contemplated that multiple target RMSEs be used, and that a corresponding compression rate is determined for each target RMSE and each of original images 321.

Step S301 generates as output one or more of "C" table(s) 322, which identify for each of original images 321 and each target RMSE a compression rate that achieves the target RMSE.

One instance of "C" table 322 may be used to store selection information for all of original images 321. Alternatively, multiple instances of "C" table 322 may be used, where each instance of table 322 corresponds to one of original images 321, for example.

Figure 4A:
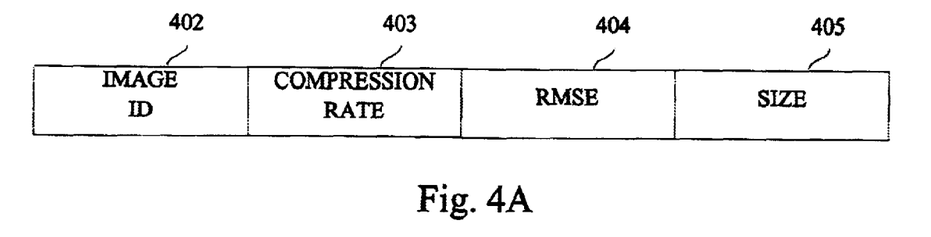
FIGS. 4A to 4C provide examples of types of information and information structures used in selecting images and improving lossy compression of images according to the present invention.

FIG. 4A provides an example of types of information contained in "C" table 322. In a case that one "C" table 322 is used for all of the images, image identifier ("ID") 402 identifies a particular one of original images 321. Where each instance of "C" table 322 corresponds to one of original images 321, image ID 402 need not be part of each table entry.

Compression rate 403 identifies the compression rate used to yield an RMSE identified in RMSE 404. Other information used to select images, such as size 405, can also be included in "C" table 322. As a further example of other information, a use indication may be included so that images that are likely to be used together may be selected to form a composite image.

Figure 5:
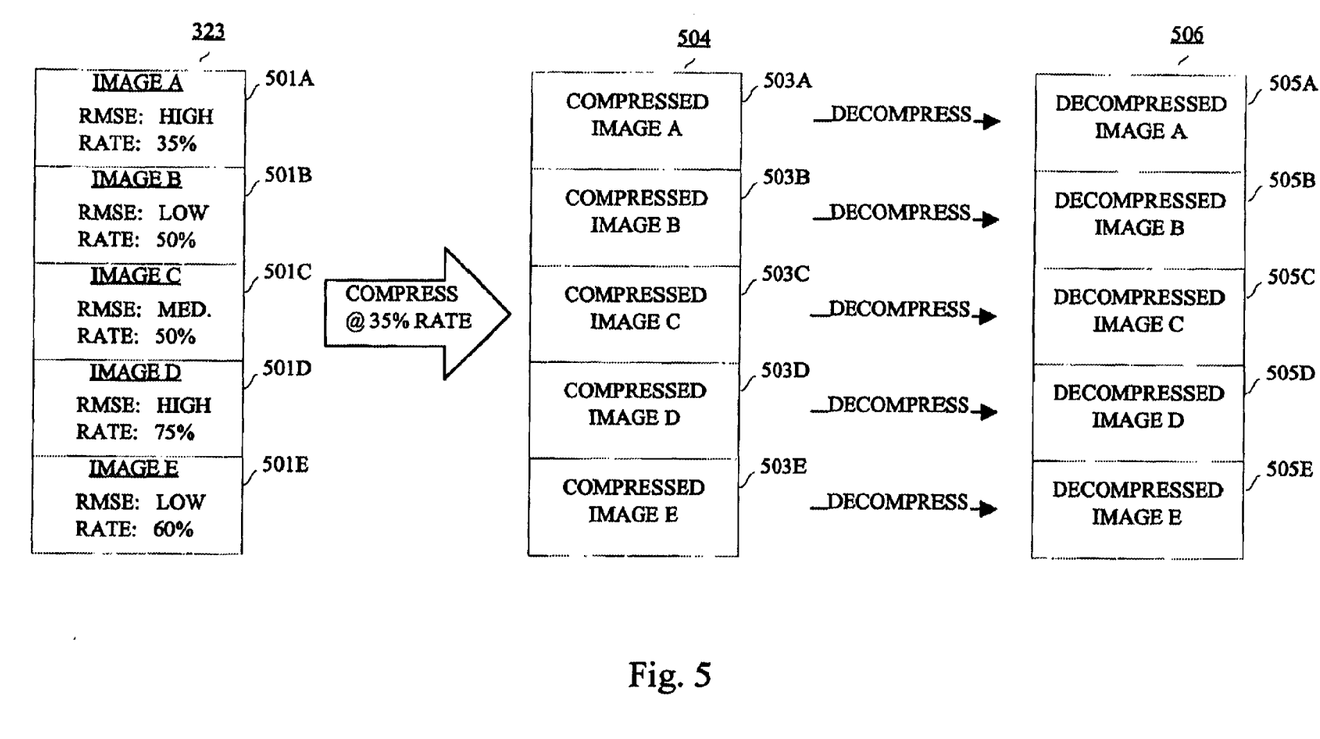
FIG. 5 provides an example of selected ones of original images 321 that form a composite image according to the present invention.

Referring again to FIG. 3, at step S302, "C" tables 322 are used to select images used to form a composite image, and the composite image is compressed. Images are selected in order to achieve a balanced combination of high and low RMSE values. To illustrate, FIG. 5 provides an example of selected ones of original images 321 that form a composite image according to the present invention.

Composite image 323 is formed from original images 501A to 501E. Each of images 501A to 501E has a corresponding RMSE and compression rate. To achieve a balance, an image with a "low" RMSE (e.g., image 501B) offsets another image (e.g., image 501D) that has a "high" RMSE. The compression rate used to achieve the RMSE associated with one of images 501A to 501E may differ from another's compression rate. To compress composite image 323, one compression rate is selected, which is preferably the minimum compression rate associated with the selected images 501A to 501E. In the example of FIG. 5, 35% is the minimum compression rate, and it is selected to compress composite image 323.

Compressed composite image 504 comprises images 503A to 503E, each of which is a compressed version of its corresponding original image (i.e., images 501A to 501E, respectively). Each of compressed images 503A to 503E is extracted from compressed image 504 and decompressed to yield decompressed images 505A to 505E. Depending on the compression method applied, indices or tags may be necessary to allow decompression of individual images from the compressed composite image. Of course, with any compression method, it is always possible to decompress the composite image first and then select, or extract, individual decompressed images thereafter.

At step S303, an RMSE measurement is determined for each of decompressed image 505A to 505E by comparing the decompressed version of the image (e.g., image 505 A) with the original version (e.g., image 501A) to identify changes from the original, which exist in the decompressed version. Step S303 is performed for each instance of composite image 323 and for each decompressed image of a composite image 323.

Thus, in step S303, an RMSE is determined for each image 321 of composite image 323 by comparing the pixels of image 321 with the pixels of a decompressed version of image 321. Referring to FIG. 5, for example, image 501A is compared with image 505A to measure a quality of image 505A as compared with image 501A. A similar measurement is performed for each of images 501B to 501E with their respective decompressed versions (i.e., images 505B to 505E, respectively). The resulting quality measurement is stored in "K" table 324.

Figure 4B:
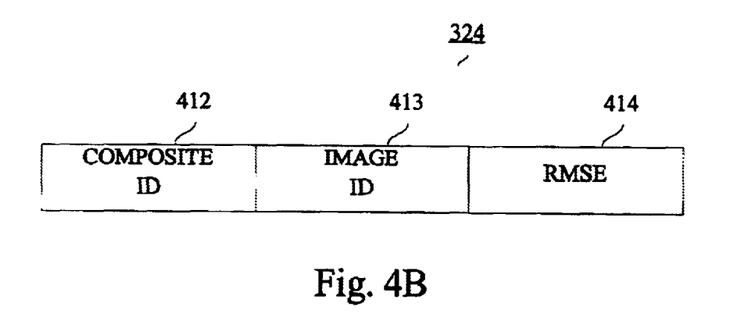

FIG. 4B provides an example of information contained in "K" table 324. Table 324 includes composite ID 412, which identifies a given composite image 323. Also included in table 324 is an RMSE 414, which is a measurement of quality associated with an image of the composite image 323, and which is determined by comparing an original image in composite image 323 with a decompressed image of composite image 506.

Referring again to FIG. 3, a relative improvement in quality is determined for each image in composite image 323, in step S304. Relative improvement values are stored in "RI" tables 325. FIG. 4C provides an example of types of information contained in "RI" table 325. Composite ID 422 identifies the composite image and image ID 423 identifies an image within the composite image identified in the composite ID 422 field.

The following is an example of an equation that is used to determine a relative improvement in quality:

$$\text{Relative Improvement} = \frac{\text{Individual Quality Measurement}}{\text{Composite Quality Measurement}}$$

Where RMSE is used as a measurement of quality for both the individual and composite versions of an image, the above equation becomes:

$$\text{Relative Improvement}_{\text{IMAGE\_ID}} = \frac{RMSE_{\text{IMAGE\_ID}}414}{RMSE_{\text{IMAGE\_ID}}404},$$

where IMAGE_ID identifies a particular one of the selected images.

That is, relative improvement field 424 comprises a ratio of an image's composite RMSE 414, which is determined from its compression as part of composite image 323, and the image's individual RMSE 404, which is determined from its compression as an individual image separate from composite image 323.

Figure 3:
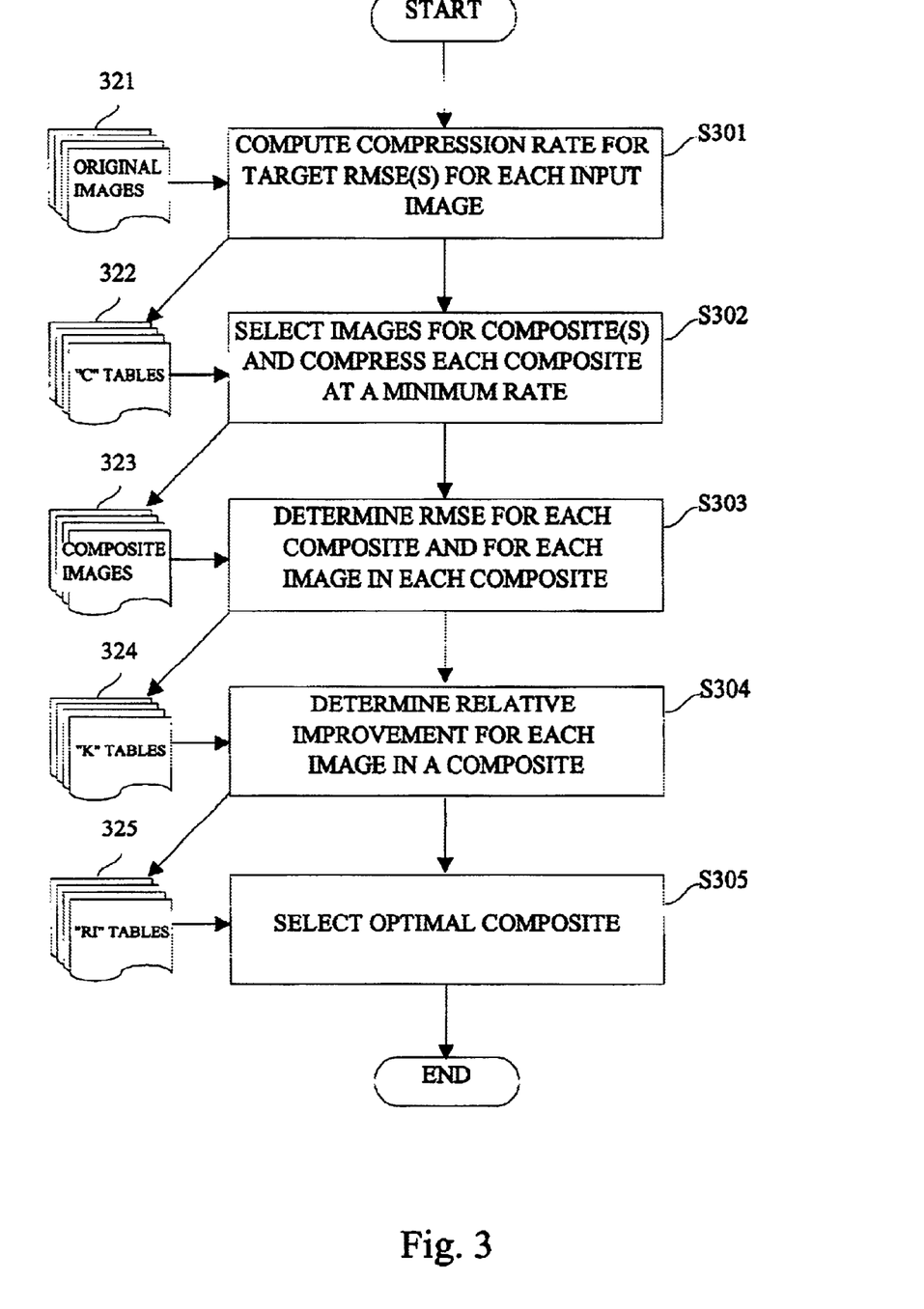
FIG. 3 provides an overview of a flow diagram of a process and process steps thereof for improving lossy compression of selected images by compressing the selected images as a composite image according to the present invention.
Figure 4C:
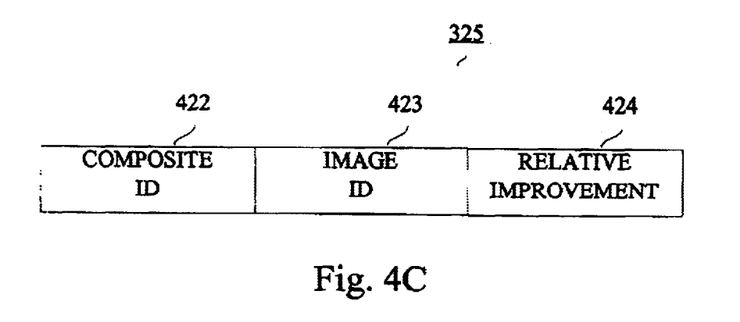

At step S305, of FIG. 3, an optimal composite image is selected. Generally, one of composite images 323 is selected where compressibility of at least one of the images in the composite image 323 is improved. Obviously, as a number of images 321 of a composite image 323 with improved compressibility increases, a determination that the composite image 323 identifies an optimal composite image 323 increases. That is, an optimal composite image 323, is one for which relative improvement 424 for each image 321 is greater than one.

In addition, an aggregate of the relative improvements 424 for each instance of composite image 323 may be determined and then compared against each other. In such a case an optimal composite image 323 is one for which relative improvement 424 is optimized for each image and where the aggregate of the relative improvements 424 is as large as possible.

Stated another way, a selected instance of composite image 323 maximizes the number of images whose compression outcome is improved as part of the composite image and maximizes an overall improvement as measured by an aggregate of the improvements associated with each of the images of a composite image.

In applications with relatively static images in a data store, once an optimal image is identified, the identified image composition can be repeatedly used without further processing.

More than one image composition can be identified as an optimal combination of images. In addition, if new images are added to the set of original images 321, it is possible that new and different composite images can be identified.

Finally, some or all of the image selection and composition process steps identified above may be implemented as software, hardware, or some combination of both.

In this regard, the invention has been described with respect to particular illustrative embodiments. However, it is to be understood that the invention is not limited to the above-described embodiments and that various changes and modifications may be made by those of ordinary skill in the art without departing from the spirit and the scope of the invention.

What is claimed is:

1. A method for use in lossy compression of image data, the method comprising:

compressing each of a plurality of images individually;

determining an individual compressibility value for each of the images;

identifying a number of image collections each of which includes more than one of the plurality of images;

compressing each collection as a whole;

determining, for each image in an image collection, a composite compressibility value, which represents the image's compressibility as part of the image collection; and for each image in an image collection, obtaining a ratio based on the image's individual compressibility value and composite compressibility value.

selecting more than one image from the plurality of images; and creating a composite image which comprises the selected images, wherein image selection is based at least in part on the obtained ratio, and wherein, for at least one of the selected images, lossy compression of the composite image results in improved compressibility.

2. A method according to claim 1, wherein improved compressibility is determined at least in part by comparing an image's compressibility when compressed separately and the image's compressibility when compressed as part of the composite image.

3. A method according to claim 2, wherein improved compressibility is determined at least in part on an aggregate improvement, which is an aggregate of an improvement measure associated with each of the selected image.

4. A method according to claim 3, wherein image selection is determined based at least in part on the aggregate improvement.

5. A method according to claim 2, wherein image selection is based at least in part on achieving some number of images whose composite compressibility value is greater than its individual compressibility value.

6. A method according to claim 1, wherein selecting a plurality of images further comprises:

obtaining, for each of the plurality of images, an individual compressibility value that specifies a measure of quality resulting from separately compressing the image at a given rate of compression; and selecting from the plurality of images based at least in part on the individual compressibility value.

7. A method according to claim 6, wherein image selection is further based on image size.

8. A method according to claim 6, wherein image selection is further based on composite image size.

9. A method according to claim 6, wherein each image is compressed using more than one compression rate, and wherein more than one individual compressibility value is associated with each image.

10. A method according to claim 9, wherein a compression rate is identified for the composite image based on the individual compressibility values associated with the selected images.

11. A method according to claim 1, wherein each of the plurality of images are individually compressed multiple times using different rates of compression.

12. A method according to claim 1, further comprising:

determining a minimum compression rate for the composite image.

13. An apparatus for use in lossy compression of image data, said apparatus comprising means for performing the functions specified in any one of claims 1 to 10, 11 and 12.

14. An apparatus comprising:

a program memory for storing process steps executable to perform a method according to any one of claims 1 to 10, 11 and 12; and a processor for executing the process steps stored in said program memory.

15. Computer-executable process steps stored on a computer readable medium, said computer-executable process steps for use in lossy compression of image data, said computer-executable process steps comprising process steps executable to perform a method according to any one of claims 1 to 10, 11 and 12.

* * * * *

UNITED STATES PATENT AND TRADEMARK OFFICE
CERTIFICATE OF CORRECTION

PATENT NO. : 6,965,698 B2
DATED : November 15, 2005
INVENTOR(S) : Eugenio Martinez-Uriegas et al.

It is certified that error appears in the above-identified patent and that said Letters Patent is hereby corrected as shown below:

<u>Column 2,</u>
Line 3, "individual," should read -- individual --.

<u>Column 4,</u>
Line 36, "individual," should read -- individual --.

<u>Column 7,</u>
Line 37, "value." should read -- value, --.

<u>Column 8,</u>
Line 2, "image." should read -- images. --; and
Line 38, "means" should read -- a computer system --.

Signed and Sealed this

Sixteenth Day of May, 2006

JON W. DUDAS
*Director of the United States Patent and Trademark Office*